D. LINDAHL.
PLOW.

No. 251,370. Patented Dec. 27, 1881.

WITNESSES
F. B. Sourward
W. C. Adams

INVENTOR
Daniel Lindahl
per M. E. Dayton
Attorney.

UNITED STATES PATENT OFFICE.

DANIEL LINDAHL, OF CHESTERTON, INDIANA.

PLOW.

SPECIFICATION forming part of Letters Patent No. 251,370, dated December 27, 1881.

Application filed December 19, 1879.

*To all whom it may concern:*

Be it known that I, DANIEL LINDAHL, of Chesterton, in the county of Porter and State of Indiana, have invented certain new and useful Improvements in Plows; and I do hereby declare that the following is a full, clear, and exact description thereof, reference being had to the accompanying drawings, and to the letters of reference marked thereon, which form a part of this specification.

This invention consists, mainly, in providing an open passage over the plow and beneath the beam at the point where, in the ordinary construction, the two parts are connected by the standard, so that tall weeds in the line of the succeeding furrow may be broken down and stubble may freely pass over the plow, instead of accumulating in front thereof and clogging the implement, and without obstruction as it passes over the mold-board. To this end the standard is curved outward on the land side in a horizontal line from its connection with the mold-board, and its upper end is secured on top of the beam, which at the point over the plow is made high enough to afford the unobstructed space required.

It consists, further, in features of construction concerning other parts of the plow, that will be hereinafter fully described, and pointed out in the claims.

Figure 1:
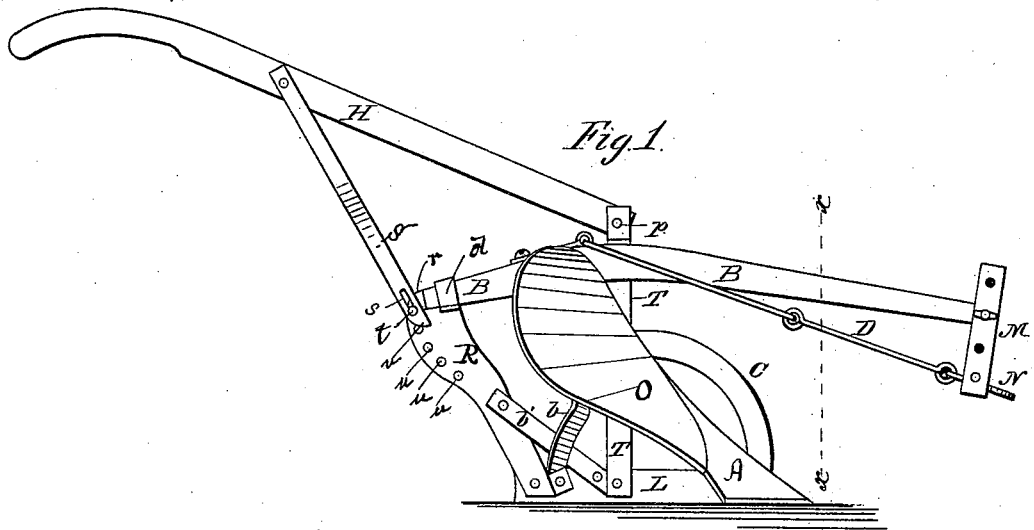
Figure 2:
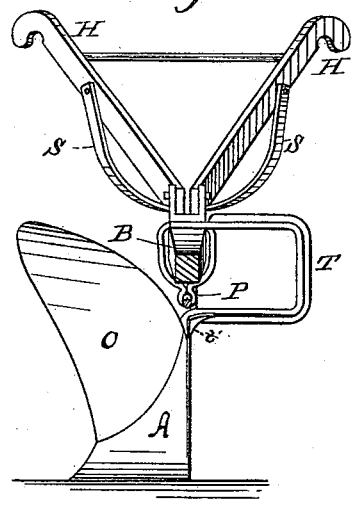
Figure 3:
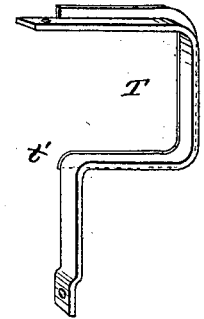
Figure 4:
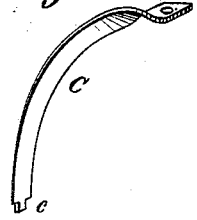
Figure 5:
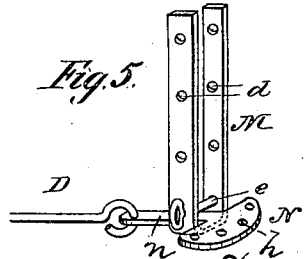

In the drawings, Figure 1 is a side elevation of a plow containing my improvements. Fig. 2 is a front view, the beam and draft-rod being shown cut off in the line $x\,x$ of Fig. 1. Fig. 3 is a perspective view of the curved standard detached. Fig. 4 shows the colter detached, and Fig. 5 is a perspective view of the clevis.

B is the beam, and A, O, and L are the principal operative parts of the plow. They are properly sustained by any suitable frame-work or system of braces, as shown in Fig. 1.

R is a standard, to which the rear end of the beam is secured.

H H are the handles, which are shown pivoted at $p$, and are adjustably supported by the bolt $t$, passed through the brace S and the plate R.

The principal feature of novelty relates to the standard, by which the operative parts of the plow are anteriorly secured to the beam, its object being twofold—viz., first, to leave an unobstructed space between the plow proper and beam for the free passage of stubble that would otherwise accumulate in front of the plow and impede its working, and, second, to break down weeds on the unplowed surface of the ground, that they may be more perfectly covered by the next furrow turned. For these purposes I employ a bent standard, T. (Separately shown in Fig. 3.) Its lower vertical portion, $v$, is secured to the landside L, and rises to a height sufficient to clear the land freely when the plow is worked to its greatest depth, when it is turned and projects horizontally on the side opposite the share to a distance about equal to the width of the cut, as shown in Fig. 2. From the outer extremity of the horizontal part described, and marked $t'$, the standard is directed back to a point over the beam, where to its extremity $w$ the beam is secured, and to its under surface. The standard springs from the top of the mold-board outward in a horizontal line, and thus serves effectively as an arm to break down the weeds which are growing in the line of the next succeeding furrow, and thus renders it easy to turn them under completely with the next furrow. The standard, being secured to the beam on its upper side, leaves the lower surface of said beam smooth and unobstructive to the passage of the stubble as it passes the mold-board.

The colter may be of the wheel order; but I have shown it to be of curved form, having the projection $c$ on its lower end to rest in a recess of the share or other part that may be in position to give it seat. At its upper end the colter is secured to the standard T at the level of the first angle in said standard. The colter of this form, therefore, co-operates with the bent standard to lift loose stubble to a proper height to pass over the plow and beneath the beam, falling either upon the land or into the furrow at the rear.

I claim as my invention—

1. The plow-standard T, bent to landward at right angles, as described, in combination with the colter C, having its upper end secured at or near the lower angle, $t'$, of said standard, substantially as set forth.

2. In a plow, the standard T, having the portion $t'$ directed horizontally outward upon the landside and extended in this direction to a distance about equal to the width of the cut made by the plow, and thence upward to the beam, whereby weeds on the unplowed ground may be broken down, and therefore more perfectly covered in the next succeeding furrow, substantially as described.

In testimony that I claim the foregoing as my invention I affix my signature in presence of two witnesses.

D. LINDAHL.

Witnesses:
M. E. DAYTON,
W. C. ADAMS.